United States Patent [19]
Holzapfel

[11] 3,849,784
[45] Nov. 19, 1974

[54] APPARATUS FOR MONITORING TRAFFIC
[75] Inventor: Jürgen Holzapfel, Neuss, Germany
[73] Assignee: Robot Foto und Electronic GmbH & Co. KG, Dusseldorf-Benrath, Germany
[22] Filed: Nov. 14, 1973
[21] Appl. No.: 415,508

[30] Foreign Application Priority Data
Nov. 25, 1972 Germany............................ 2257818

[52] U.S. Cl............ 346/107 VP, 340/38 R, 354/109
[51] Int. Cl. .............................................. G01d 1/12
[58] Field of Search.............. 340/38 R; 346/107 VP

[56] References Cited
UNITED STATES PATENTS
3,060,434 10/1962 Biedermann.................. 346/107 VP
3,165,373 1/1965 Scott............................ 346/107 VP Primary Examiner—Thomas B. Habecker
Attorney, Agent, or Firm—Darbo, Robertson & Vandenburgh

[57] ABSTRACT

A traffic monitoring apparatus includes a camera and a photoflash unit to automatically take a picture of a vehicle illegally entering an intersection against a stop light. The camera simultaneously takes a picture of a time display device. One of the times indicated on that device is derived from an electronic digital counter. To ameliorate the problem of false counts in the counter caused by the opening of the switch which initiates the photoflash, a Zener diode and a capacitor are connected in parallel with that switch.

8 Claims, 4 Drawing Figures

APPARATUS FOR MONITORING TRAFFIC

BACKGROUND AND SUMMARY OF THE INVENTION

A pending patent application Ser. No. 373,966, filed June 27, 1973, on which Herbert Maronde and I are the inventors, and assigned to the same assignee, relates to an apparatus for monitoring traffic at a road intersection, at which there is a traffic control light having a "stop" period. The monitoring apparatus comprises a photographic camera which is arranged to be actuated by a sensor. The sensor is responsive to a vehicle entering the intersection during the stop period. The camera takes a photograph of both the intersection and a time meter. According to the above mentioned pending patent application, the time meter indicates time with an accuracy of at least tenths of seconds. There is a memory and time display device to which the reading of the time meter is automatically transferred at the beginning of the stop period. The time display device is photographed together with said time meter and said road intersection. In a preferred embodiment the time meter is an electronic digital counter. The counter reading of the digits of said digitial counter corresponding to the small time units are transferred to a register by a control impulse produced at the beginning of the stop period. Thereby the exact moment, when the traffic control lights have changed to stop phase, is stored, and when a vehicle enters the road intersection contrary to traffic regulations a record is made not only of the time when the photograph is taken but also the relation of this time to the previous moment when the traffic control lights had changed to "stop."

There have also been prior art apparatus for monitoring a road intersection in which an electronic flashlight is triggered simultaneously with the photographic exposure, in order to take a satisfactory photograph of the vehicle and of the traffic situation independently of environmental illumination conditions. Such an electronic flash is generated by discharging a storage capacitor, which has previously been charged to an operating voltage of, for example, 500 volts, through a noble-gas-filled discharge tube, whereby an extremely short and extremely high discharge current is caused to flow. This discharge tube (electronic or photoflash tube) has a triggering electrode. A high voltage peak is applied to the triggering electrode, thereby initiating the discharge through the electronic flash tube. In the prior art, a triggering capacitor is charged through a charging resistor. The triggering capacitor is usually charged to a partial voltage derived by a voltage divider from the operating voltage. In order to trigger the flash, a circuit is closed through a triggering contact, whereby the triggering capacitor is discharged through the primary winding of a triggering transformer. Said triggering electrode is connected to the secondary winding of this triggering transformer.

If an electronic flashlight apparatus of this type is to be used in combination with a traffic monitoring device as described in the specification of said patent application Ser. No. 373,966 and comprising an electronic digital counter, there will be unexpected problems, in that, surprisingly, the counter reading may be wrong. A wrong counter reading and, therefore, a wrong time indication is, of course, detrimental to an apparatus of the present type, which is to produce evidence in court. I have found that the problems encountered are due to the fact that the voltage peaks occurring in the primary circuit of said triggering transformer, when the triggering contact is opened after having been closed during the actuation of the camera, will affect the electronic circuits of the counter, thereby producing an error in the counter reading.

It is an object of the invention to provide an apparatus of the type initially mentioned for monitoring traffic and comprising an electronic digital counter, said apparatus being independent of environmental illumination.

Another object of the invention is to combine a traffic monitoring apparatus having an electronic digital counter with an electronic flashlight equipment.

A more specific object of the invention is to provide a combination of a traffic monitoring apparatus having a time metering electronic digital counter, and of an electronic flashlight equipment, while avoiding adverse effects of the flashlight triggering circuit on the electronic digital counter.

According to the broad concept of the invention an apparatus for monitoring the traffic at a road intersection and comprising an electronic digital counter also includes an electronic flashlight device comprising a photoflash tube having a triggering electrode. A storage capacitor is connected across the electronic flash tube and is charged to an operating voltage. A triggering capacitor is connected to be charged through a charging circuit including a charging resistor, and to be discharged through a triggering contact (e.g., switch) and the primary winding of a triggering transformer. The secondary winding of the transformer is connected to the triggering electrode of the flash tube. In order to eliminate adverse influence of the electronic flashlight unit on the electronic digital counter, anti-interference means are connected to said charging circuit intermediate said charging resistor and said triggering capacitor.

I have found that with anti-interference means so connected, the above mentioned problems are eliminated and a traffic monitoring apparatus having an electronic digital counter can safety be combined with a photo flashlight.

In one form the anti-interference means comprises at least one series arrangement of a resistor and a Zener diode and is connected in parallel with said triggering contact. The anti-interference means can also comprise an anti-interference capacitor connected in parallel to said triggering contact.

DESCRIPTION OF SPECIFIC EMBODIMENT

The following disclosure is offered for public dissemination in return for the grant of a patent. Although it is detailed to ensure adequacy and aid understanding, this is not intended to prejudice that purpose of a patent which is to cover each new inventive concept therein no matter how others may later disguise it by variations in form or additions or further improvements.

Figure 1:
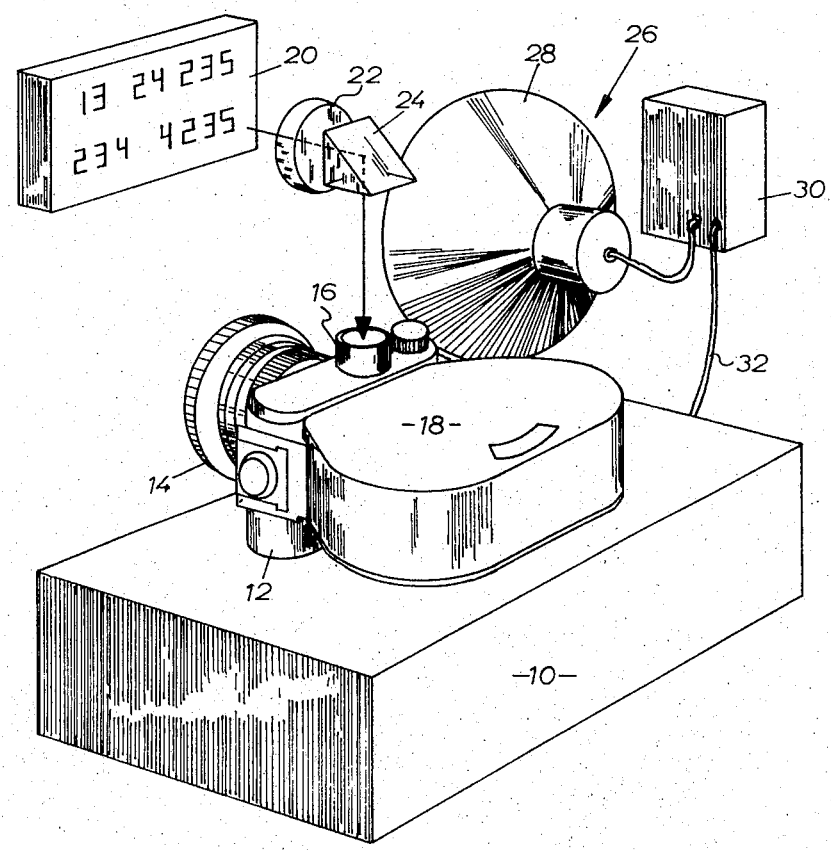
FIG. 1 is a perspective view of the structure of an embodiment of the invention.

Referring to FIG. 1, there is a case 10 containing the electronic elements, and camera controls of the apparatus. A photographic camera 12 is mounted on case 10. Camera 12 has a main objective 14 directed at a road intersection to be monitored. It also has a tube 16 extending out of a side wall of the camera at right angles to the main objective 14. The tube 16 is part of an optical system which produces a secondary image of an object, viewed through the tube, in a corner of the main image produced by the main objective 14. The camera 12 may be of the type shown and disclosed in U.S. Pat. No. 3,603,227. A cartridge 18 containing a considerable supply of photographic film is affixed to the case of the camera whereby the apparatus can take a large number of photographs before it must be reloaded.

The object to be photographed through the tube 16 is a data display device 20. This data display device 20 is imaged, in a corner of the main image, through auxiliary objective 22, reflecting prism 24 and tube 16. In the top line data display device 20 is shown hour, minute, second and tenths of a second of local time. The second line shows the day (in this case the 234th day of the year) and the east significant digits of time, when the traffic control light changed to "stop"; in the drawing this would be 4 minutes (the least significant digit of 24) and 23.5 seconds. To make the apparatus independent of the environmental illumination, there is a photoflash unit generally 26. It comprises a reflector 28 and an electric unit 30, which is connected to case 10 by a cable 32. The elements are enclosed by a housing (not shown), having a front plate with openings for the reflector 28 and the objective 22.

Figure 2:
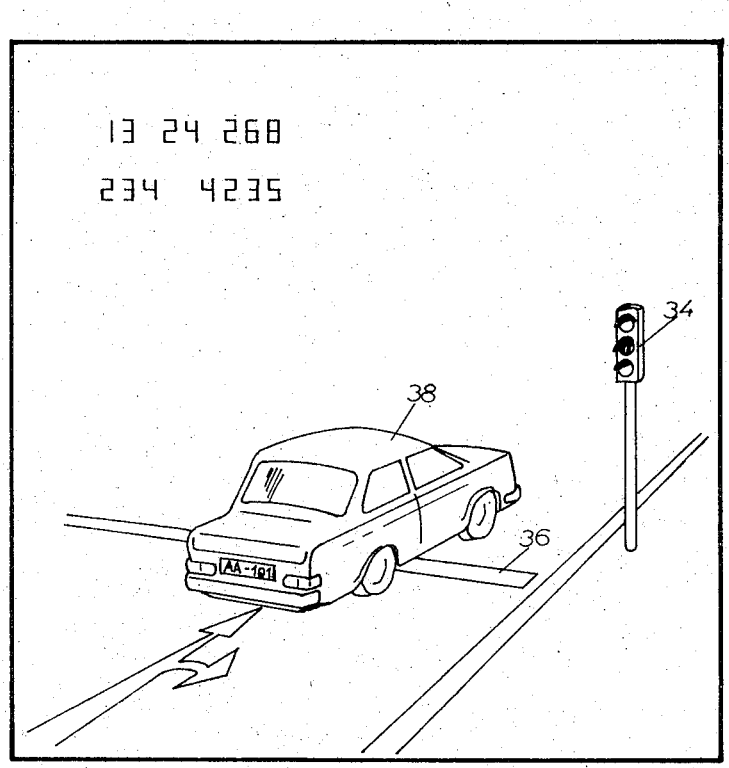
FIG. 2 shows a photograph taken with the apparatus of FIG. 1, of a road intersection, a violating vehicle and time data.

FIG. 2 illustrates a picture taken with an apparatus of FIG. 1. There is a road intersection controlled by a traffic light 34 and a stop line 36 on the road. Although the traffic light is "red," commanding "stop," a vehicle 38 has crossed the stop line 36. The display device 20 is imaged in the top left corner of the main image and shows the exact date and time of the traffic violation along with the time when the traffic light last changed to "red." It can be seen that this light change was 3.3 seconds before the photograph was taken.

The display device 20 is part of a circuit as disclosed in the patent application Ser. No. 373,966, filed on June 27, 1973, and entitled DEVICE FOR MONITORING TRAFFIC, the disclosure of which is incorporated herein by reference.

Figure 3:
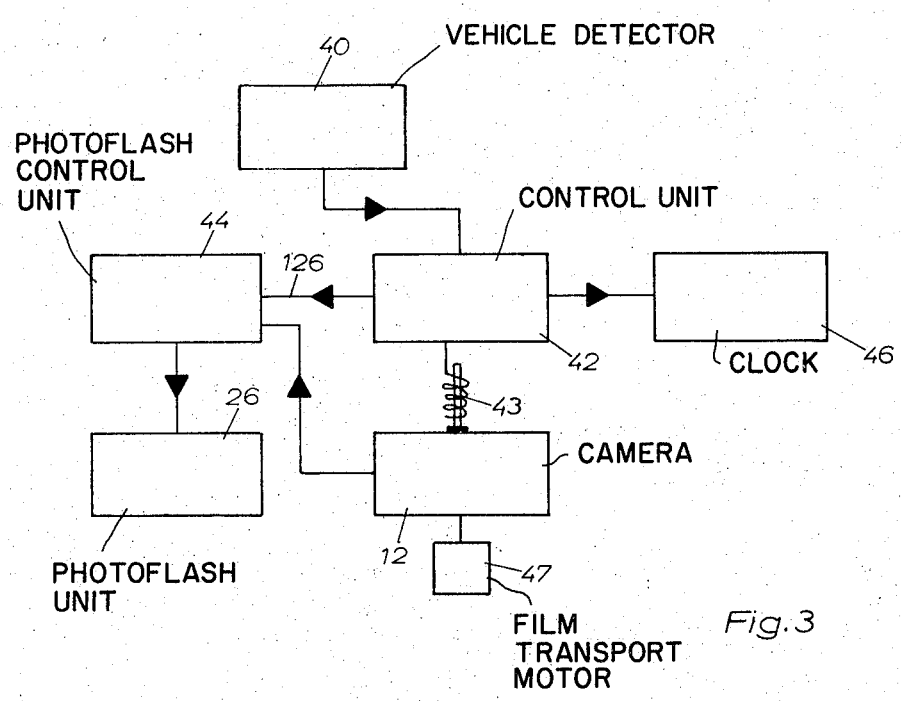
FIG. 3 is a block diagram of the system of the invention.

FIG. 3 is a block diagram of the system. When a vehicle 38 crosses the stop line 36 (or shortly thereafter) during the "red" or "stop" period of the traffic light, a detector 40 produces an actuating signal. This signal is applied to a control unit 42. The control unit includes a solenoid 43 for actuating the camera 12. The shutter of camera 12 has a trigger (electrical) contact, which triggers the photoflash control unit 44, whereby the photo flashlight in unit 26 produces illumination. At the same time, the control unit 42 applies a signal to the clock 46 to stop the clock for the duration of the photographic exposure. This clock control is of the type shown in the aforementioned patent application Ser. No. 373,966.

After the exposure, the film in camera 12 is automatically advanced by automatic film transport motor means 47.

Figure 4:
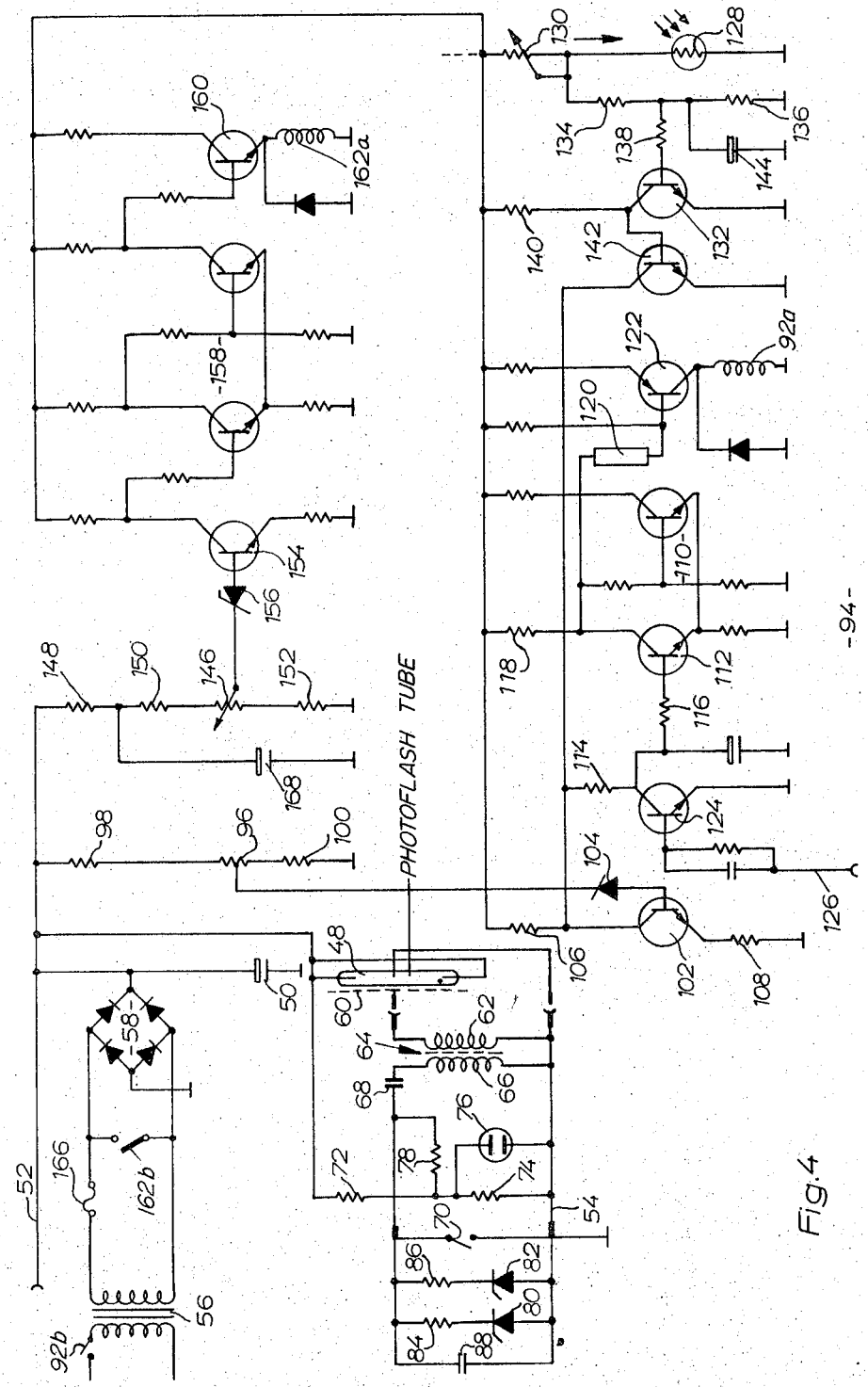
FIG. 4 is a wiring diagram of a flashlight unit.

Referring now to FIG. 4, there is a gas-filled photoflash tube 48 (which is a part of unit 26). Flash tube 48 is connected across a storage capacitor 50 through lead 52 and ground connection 54. Capacitor 50 is charged to a voltage of 500 volts by power from the mains through transformer 56 and full-wave rectifier 58. To trigger the flash tube 48 it has a triggering electrode 60. The triggering electrode is connected to one end of the secondary winding 62 of a triggering transformer 64. The other end of secondary winding is grounded. The primary winding 66 of the triggering transformer is connected in a series circuit which includes a triggering capacitor 68 and a triggering contact or switch 70. This switch is located in the camera 12 to be closed and opened by the camera shutter. One end of the primary winding 66 is grounded, and the other end is connected to the triggering capacitor 68. There is a voltage divider comprising resistors 72 and 74 across the storage capacitor 50. At a partial voltage pickoff point on this voltage divider a stabilizing glow lamp 76 is connected. Triggering capacitor 68 is connected to this pickoff point through a charging resistor 78 to be charged by the partial voltage.

In accordance with the present invention, this charging circuit further comprises a pair of Zener diodes 80, 82 connected in parallel between ground and the junction of charging resistor 78 and triggering capacitor 68. Each Zener diode 80, 82 has a protective resistor 84 and 86, respectively, connected in series therewith. An anti-interference capacitor 88 is connected in parallel to the combination of said Zener diodes 80, 82 and resistors 84, 86.

The Zener diodes 80, 82 and capacitor 88 form an anti-interference network to lessen the pulse occurring when switch 70 is opened. The pulse is lessened by in magnitude and as to components. By the Zener diodes 80 and 82 there is a limiting of the peak voltage generated by the inductance of transformer 64 in the discharge circuit 66, 68, 70, when the contact 70 is opened. Capacitor 88 shunts high frequency components of the pulse. The invention is based on the discovery that peak voltages of these pulses are the major source of spurious counts, which, without the anti-interference network described, tend to render the counter reading wrong. Resistors 84 and 86 have the function of protecting the Zener diodes 80 and 82, respectively, against excessive currents.

A relay contact 92b in series with the primary winding of supply transformer 56 is used to limit the voltage across capacitor 50. Relay contact 92b is actuated by a relay solenoid 92a which is energized through a control circuit 94 depending on the voltage across capacitor 50.

The control circuit 94 includes a voltage divider comprising a potentiometer 96 and series connected resistors 98 and 100. The slider of potentiometer is connected to the base of a transistor 102 through a Zener diode 104. The collector of transistor 102 is connected to an operating d.c. voltage of 24 volts through a resistor 106. The emitter of transistor 102 is grounded through a resistor 108. Thus, if the voltage across capacitor 50 exceeds a preselected value, Zener diode 104 becomes conductive, and thus transistor 102 also will be rendered conductive. Thereby the potential at the collector of transistor 102 becomes less positive, whereby Schmitt-trigger 110 changes its state, the base of transistor 112 of Schmitt-trigger 110 being connected to the collector of transistor 102 through resistors 114 and 116. Transistor 112 becomes non-conductive, whereby the voltage drop across its collector resistor 118 is reduced and the potential of its collector becomes positive. Through a resistor 120 a transistor 122 is rendered conductive. The relay solenoid 92a connected in the collector circuit of transistor 122 is thereby energized and opens its relay contact 92b, whereby the charging current to capacitor 50 is interrupted. Thereby the storage capacitor 50 is always charged to a well defined voltage.

A transistor 124 has its collector-emitter junction connected between ground and the junction of resistors 114 and 116. The base of transistor 124 is connected to an input 126, which, as seen in FIG. 3, is the connection from the control unit 42 to the flashlight control unit 44. While the camera release solenoid is energized and, after the exposure, the film transport motor is energized, the transistor 124 is rendered conductive, thereby actuating the Schmitt-trigger 110 in similar manner, as if transistor 102 were rendered conductive by Zener diode 104. Thus recharging of the storage capacitor 50 is interrupted during camera release and film transport. Thus the total of the currents flowing in the apparatus is reduced. It has been found that this reduces the spurious signals caused by these currents to below a critical level and eliminates the otherwise existing risk of false counts in the digital counter due to such spurious signals.

The flashlight is also switched off during daylight, i.e., when adequate ambient light is available. To this end, there is a photoresistor 128 in series with an adjustable resistor 130, which form a voltage divider. The resistance of photoresistor 128 is a function of environmental illumination to which the photoresistor is exposed. The adjustable resistor 130 permits setting of the illumination level, to which the device is to respond. During daylight, the resistance of photoresistor 128 is low, thus the junction between resistor 130 and photoresistor 128 is on near ground potential. A transistor 132, which has its base connected to this junction through a voltage divider comprising resistors 134, 136 and a resistor 138 is rendered non-conductive. The collector of transistor 132 is connected to positive operating potential through a resistor 140, and to the base of a further transistor 142. Transistor 142 has its emitter-collector junction connected in parallel to the series connection of transistor 102 and resistor 108. When transistor 132 becomes non-conductive (by reason of adequate ambient light), transistor 142 will be rendered conductive resulting in relay solenoid 92 being energized through Schmitt-trigger 110 and transistor 122. This opens relay contact 90. A capacitor 144 in parallel to resistor 136 eliminates the influence of illumination changes of short duration.

There is also a safety device protecting the storage capacitor 50 (which is an electrolytic capacitor) against excessive voltage which could destroy the capacitor. This safety device comprises a voltage divider composed of a potentiometer 146 and series connected resistors 148, 150 and 152. The slider of the potentiometer 146 is connected to the base of a transistor 154 through a Zener diode 156. Transistor 154 is connected to trigger a Schmitt-trigger 158. When transistor 154 becomes conductive, a transistor 160 is also rendered conductive. A relay solenoid 162a is connected in the collector-emitter circuit of the transistor 160 and is energized by the transistor 160 becoming conductive. Normally open relay contact 162b of relay solenoid 162a is closed thereby and short circuits the input to full-wave rectifier 58. This causes a fuse 166 in series with the secondary winding of the transformer 56 to blow, whereby the whole apparatus is rendered inoperative.

The details of this protective circuit are well known transistor technique and need not be described in detail.

A capacitor 168 connected across potentiometer 146 and resistors 150, 152 makes sure that the protective circuit does not respond to short-time voltage peaks.

I claim:

1. In an apparatus for monitoring the traffic at a road intersection at which there is a control light having a "stop" period, which apparatus includes: a photographic camera actuated when a vehicle enters the intersection during said "stop" period, a time meter in the form of an electronic digital counter which receives counting pulses at a given frequency, a register having a control input and connected said digital counter so that the small time units are transferred to said register when a control impulse is applied to said control input at the beginning of the "stop" period, and a time display device connected to said register to display the time information stored in said register, said camera taking a photograph of both said road intersection and said time display device, the improvement comprising:

an electronic photoflash device comprising an electronic flash tube having a triggering electrode, a storage capacitor connected across said electronic flash tube for supplying the electric power to said flash tube to cause it to emit light, power supply means connected to said capacitor to charge it to an operating voltage, a triggering transformer having a primary and a secondary winding, the secondary winding being connected to the triggering electrode, triggering circuit means including a triggering capacitor and a triggering switch connected to the primary winding for energizing the transformer to initiate the discharge of the flash tube when said switch is closed, charging means connected to the triggering capacitor for charging the capacitor, and anti-interference means connected to the triggering circuit means for lessening the pulse occurring when said switch is opened to thereby ameliorate the occurrence of false counts in the electronic digital counter due to said pulse.

2. In an apparatus as claimed in claim 1, wherein said anti-interference means comprises voltage limiting means in shunt connection with said triggering switch.

3. In an apparatus as claimed in claim 2, wherein said voltage limiting means includes a Zener diode.

4. In an apparatus as claimed in claim 2, wherein said voltage limiting means includes a Zener diode and an ohmic resistor in series.

5. In an apparatus as claimed in claim 4 and further comprising an anti-interference capacitor also connected in shunt connection to said triggering switch.

6. In an apparatus as claimed in claim 1, and further comprising: solenoid means for actuating said camera and causing an exposure to be made, film transport motor means automatically energized after each said exposure, and means for inhibiting the charging of said storage capacitor while either of said solenoid means or said film transport motor means are energized.

7. In an apparatus as claimed in claim 6, and further comprising: a relay having a relay contact connected to said power supply means for disabling the power supply means from supplying power to said storage capacitor when said relay is energized, and means connected to the relay for energizing said relay and connected to said storage capacitor to energize said relay when said voltage exceeds a preselected value, said inhibiting means being connected to said relay energizing means to cause energization of said relay also in response to a signal indicating energization of either said solenoid means or said film transport motor means.

8. In an apparatus as claimed in claim 7, wherein said relay energizing means comprises: a voltage divider connected across said storage capacitor and having a tap, a first transistor having a base, a Zener diode connected between said tap and said base, a Schmitt-trigger connected to the first transistor to be triggered by said first transistor becoming conductive, and a second transistor having a collector circuit and connected to said Schmitt-trigger to be rendered conductive by the triggering of said Schmitt-trigger, said relay being connected in the collector circuit of said second transistor, and wherein said inhibiting means comprises a third transistor having a base and an emitter-collector junction, said junction being connected in shunt connection to said first transistor and said base being connected to receive said energization indicating signal and rendering said third transistor conductive.

* * * * *